(12) United States Patent
Rohatgi et al.

(10) Patent No.: US 11,803,569 B2
(45) Date of Patent: Oct. 31, 2023

(54) COMPUTER SYSTEM AND METHOD FOR ACCESSING USER DATA THAT IS DISTRIBUTED WITHIN A MULTI-ZONE COMPUTING PLATFORM

(71) Applicant: Procore Technologies, Inc., Carpinteria, CA (US)

(72) Inventors: Anuj Rohatgi, Austin, TX (US); Manish Jain, Los Angeles, CA (US); Terrence Cole, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/494,485

(22) Filed: Oct. 5, 2021

(65) Prior Publication Data

US 2023/0108031 A1 Apr. 6, 2023

(51) Int. Cl.
   *G06F 16/27* (2019.01)
   *H04L 67/1097* (2022.01)

(52) U.S. Cl.
   CPC .......... *G06F 16/27* (2019.01); *H04L 67/1097* (2013.01)

(58) Field of Classification Search
   CPC .............................. G06F 16/27; H04L 67/1097
   See application file for complete search history.

(56) References Cited

U.S. PATENT DOCUMENTS

| | | | |
|---|---|---|---|
| 9,948,522 B2 | 4/2018 | Marinelli et al. | |
| 10,608,844 B2 | 3/2020 | Cidon et al. | |
| 2002/0188538 A1 | 12/2002 | Robertson et al. | |
| 2010/0174731 A1 | 7/2010 | Vermeulen et al. | |
| 2013/0124525 A1* | 5/2013 | Anderson | G06F 16/278 707/737 |
| 2015/0006890 A1* | 1/2015 | Roth | G06F 21/602 713/165 |
| 2017/0033834 A1* | 2/2017 | Gross | H04W 48/18 |
| 2017/0357707 A1 | 12/2017 | Gleba et al. | |

(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

(Continued)

*Primary Examiner* — Tarek Chbouki
(74) *Attorney, Agent, or Firm* — Lee Sullivan Shea & Smith LLP

(57) ABSTRACT

Systems and methods for managing access to data stored in a distributed manner across different zones of a multi-zone computing platform involve maintaining a global representation of all data stored within the multi-zone computing platform. After receiving a request on behalf of a user to access given data, a first zone of the multi-zone computing platform (i) obtains, from the global representation, information indicating a particular zone where the given data is stored, (ii) validates the request, and (iii) if the validation is successful, processes the request. If the given data is stored at the first zone, the first zone retrieves the given data for provision to the user. If the given data is stored at a second zone, the first zone issues a request to the second zone to validate the request, and if the validation is successful, retrieve the given data for provision to the user.

20 Claims, 7 Drawing Sheets

(56) References Cited

U.S. PATENT DOCUMENTS

| | | | |
|---|---|---|---|
| 2019/0036733 A1* | 1/2019 | Feldpusch | H04L 45/04 |
| 2020/0195719 A1* | 6/2020 | Mehta | H04L 67/1097 |
| 2021/0089238 A1* | 3/2021 | Muniswamy-Reddy | G06F 3/0637 |
| 2021/0182131 A1* | 6/2021 | Reuzel | H04L 67/133 |
| 2021/0337027 A1* | 10/2021 | Chau | H04L 67/12 |
| 2022/0417103 A1* | 12/2022 | Beckett | H04L 12/4633 |

OTHER PUBLICATIONS

Pang, Ruoming et al., Zanzibar: Google's Consistent, Global Authorization System, Proc. of 2019 USENIX Annual Technical Conference, 2019, pp. 1-14.

International Searching Authority, PCT International Search Report and Written Opinion, PCT International Application No. PCT/US2022/045554, dated Feb. 2, 2023, 11 pages.

\* cited by examiner

COMPUTER SYSTEM AND METHOD FOR ACCESSING USER DATA THAT IS DISTRIBUTED WITHIN A MULTI-ZONE COMPUTING PLATFORM

BACKGROUND

Software applications are used on a regular basis to perform and manage tasks in users' personal and professional capacities. As some examples, software applications may assist users with managing tasks related to email communications, customer relationship management, billing and payroll processing, human resources management, and construction management. Many other types of software applications exist.

As software applications continue to evolve, become more complex, and aim to reach a growing number of consumers, managing and storing user data for software applications can become a challenging endeavor. Therefore, the tasks of managing, storing, and accessing user data for a software application in a way that meets consumer expectations and provides a positive user experience is desirable.

OVERVIEW

As software has continued to evolve, the provision of software applications using a software as a service ("SaaS") model has become increasingly widespread. Typically, SaaS applications are run and delivered to users over a data network (e.g., the Internet, etc.) by back-end computing platforms that are configured to store and provide access to data that is created for the different users of the SaaS application.

Under a SaaS model, user data for a SaaS application is typically stored by the back-end computing platform in a centralized manner at one or more physical computing systems residing at a single physical location, such as a single data center. However, the typical approach of storing such user data in a centralized manner has several drawbacks and limitations.

As one example, storing user data in a centralized manner within one or more physical computing systems residing at a single physical location may impede compliance with laws (referred to herein as data export regulations) that govern how user data for a SaaS application should be stored and/or how access to user data that is stored at that single physical location should be managed.

As another example, storing user data in a centralized manner at one or more physical computing systems residing at a single physical location requires users of a SaaS application—who may be located in various different physical locations—to access data from a single physical location, which may result in increased network congestion and/or unnecessary delays between the time of requesting data and the time of being provided access to the requested data, thereby resulting in an undesirable user experience.

As yet another example, storing user data in a centralized manner at one or more physical computing systems residing at a single physical location increases the risk of a single point of failure—that is, in the event of malfunction at the single physical location (e.g., loss of power), the entirety of the user data that is stored at that single physical location may become inaccessible, thereby resulting in an undesirable user experience.

One possible way to overcome these drawbacks of storing user data for a SaaS application in a centralized manner is by distributing the storage of user data for the SaaS application across multiple different physical computing systems that reside at multiple different physical locations within the world (e.g., either in the same country or different countries), which may provide several advantages over the typical approach of storing user data in a centralized manner.

For example, distributing the storage of user data for a SaaS application across multiple different physical computing systems residing at multiple different physical locations may enable a back-end computing platform running the SaaS application to handle data storage and data access requests based on applicable data export regulations. As another example, distributing the storage of user data for a SaaS application across multiple different physical computing systems residing at multiple different physical locations may enable storage of user data at a location that is in closer proximity to one or more physical locations from where the user data is most likely to be accessed, thereby reducing potential delays between the time the user data is requested to be accessed and the time the user data is provided for access. Other advantages of distributing user data for a SaaS application may also exist.

In order to implement a SaaS application for which user data is stored in a distributed manner at multiple different physical locations, the back-end computing platform for the SaaS application may comprise multiple different sets of discrete compute resources that are at least logically separated from one another, and in many cases, also physically separated from one another. In such an arrangement, each different set of logically-separated compute resources may be referred to as a "zone," and the back-end computing platform itself may be referred to as a "multi-zone" computing platform.

One possible example of such a multi-zone computing platform may comprise multiple different zones that each comprises a discrete set of logically-separated compute resources (e.g., a single computing system or multiple, interconnected computing systems) residing at a different physical location.

In practice, the user data for the SaaS application that is created and stored by the multi-zone computing platform disclosed herein may comprise a collection of data objects that are created by the multi-zone computing platform based on input from the users of the SaaS application and stored within the multi-zone computing platform, where such data objects could take any of various different forms depending on the nature of the SaaS application. Further, in practice, the data objects that are created and stored by the multi-zone computing platform could have various different relationships between them, where such relationships could take any of various different forms depending on the nature of the SaaS application.

As noted above, the multi-zone computing platform disclosed herein may store the data objects for the SaaS application in a distributed manner across the multiple different zones of the multi-zone computing platform, which may provide various advantages over the typical approach of storing such data objects in a centralized manner. In this respect, the specific manner in which the different data objects are distributed across the multiple different zones of the multi-zone computing platform could take any of various forms.

As one possibility, the particular zone where a data object is stored within the multi-zone computing platform may be selected based at least in part on a location of a user that initiated creation of the data object and/or a company that employs the user. As another possibility, the particular zone where a data object is stored within the multi-zone computing platform may be selected based at least in part on the nature of the data object being stored (e.g., some types of data objects may be stored in one zone while other types of data objects may be stored in another zone). The manner in which the multi-zone computing platform distributes storage of the user data for a SaaS application could take various other forms as well.

Although distributing storage of user data for a SaaS application across different zones of a multi-zone computing platform provides several advantages, such a configuration also presents additional technical challenges in terms of how to handle management of and/or access to the user data.

Therefore, disclosed herein is new technology that enables management and access of user data for a SaaS application that has been stored in a distributed manner across multiple different zones of a multi-zone computing platform.

In accordance with one aspect of the disclosed technology, the multi-zone computing platform may maintain a "global representation" of all available user data for the SaaS application that provides an indication of where each data object is stored within the multi-zone computing platform, which may be available for access by every zone of the multi-zone computing platform, and when a given zone of the multi-zone computing platform receives a request from a client station to access a given data object that is stored within the multi-zone computing platform, the given zone may obtain and use information from this global representation in order to route the request to the appropriate zone of the multi-zone computing platform.

At a high level, the global representation of available user data for a SaaS application may include (i) a respective set of object metadata for each available data object that is stored within the multi-zone computing platform and perhaps also (ii) "relationship" metadata that provides information about the relationships (i.e., the logical connections) between data objects stored within the multi-zone computing platform. Each of these categories of metadata may take various forms.

For instance, in the global representation of the available user data for the SaaS application, the respective set of object metadata for a data object may include certain metadata fields that provide a baseline set of information about the data object that can be used by a zone when handling a request to access the data object. As will be discussed in further detail below, these metadata fields could take various forms, and in at least one implementation, may include fields that respectively contain, for each data object, a unique identifier, an indication of a data object type, and a "routing address" that identifies a storage location within the multi-zone computing platform.

As noted above, in addition to the respective set of object metadata for each available data object, the global representation of the available user data for the SaaS application may also include relationship metadata that provides information about the relationship (i.e., logical connections) between data objects stored within the multi-zone computing platform. As will be discussed in further detail below, this relationship metadata may also take various forms.

The global representation of available user data for a SaaS application may include other kinds of data as well.

Further, the global representation of available user data for a SaaS application disclosed herein may be embodied in various forms. As one possibility, the global representation may be embodied in the form of a connected graph (or network), where the respective sets of object metadata for the data objects may be embodied as respective nodes within the connected graph, and the relationship metadata may be embodied as links between the nodes of the connected graph. As another possibility, the global representation may be embodied in the form of a database or a set of one or more linked databases containing the respective sets of object metadata and/or relationship information for the data objects stored by the multi-zone computing platform. As yet another possibility, the global representation may be embodied in a combination of different forms. The global representation may take other forms as well.

Notably, while the global representation of available user data for a SaaS application is preferably arranged to provide information about all available data objects that are stored within the multi-zone computing platform (or at least the majority of available data objects), it is also generally intended to be a lightweight resource that preferably includes only a baseline set of metadata that enables a zone of the multi-zone computing platform to evaluate and handle access requests for data objects.

As noted above, in practice, the global representation may be stored by the multi-zone computing platform in a manner that enables access to the global representation by each zone of the multi-zone computing platform, which may take various forms. To accomplish this, in one implementation, the global representation may be stored at a single designated zone within the multi-zone computing platform, and while that designated zone may then be able to access the global representation directly, the other one or more zones of the multi-zone computing platform may then access and obtain information from the global representation by communicating with the designated zone via a data network (e.g., by issuing a request to the designated zone for information from the global representation and then receiving the requested information back from the designated zone). Alternatively, in another implementation, a mirrored copy of the global representation may be stored at each different zone within the multi-zone computing platform (or at least each of multiple different zones) such that each zone may access the global representation without being required to communicate with another zone over a data network in order to access the global representation. In such an implementation, the multi-zone computing platform may also employ additional technology that keeps the mirrored copies of the global representation stored at the different zones in "synchronization" with one another (e.g., by pushing updates to each zone and periodically performing comparisons between mirrored copies) so that each such mirrored copy generally provides the same global representation of available user data.

In accordance with another aspect of the disclosed technology, disclosed herein are example techniques for processing a request to access user data utilizing information that is obtained from the global representation. In this respect, each zone of a multi-zone computing platform as disclosed herein may be configured such that, when the zone receives a request from a client station to access certain user data that is stored within the multi-zone computing platform, the zone may obtain and utilize information from a global representation of user data stored within the multi-zone computing platform to (i) determine if the data access request is valid and (ii) if the data access request is valid, route the request to an appropriate zone of the multi-zone computing platform (if the appropriate zone is different from the zone that received the request) and then provide the user data to the client station to be displayed to the user.

Accordingly, in one aspect, disclosed herein is a method that involves a computing system that defines a first zone of a multi-zone computing platform performing functions involving: (i) receiving, from a client station, a request to access at least one given data object that is stored within the multi-zone computing platform; (ii) obtaining, from a global representation of available data that is stored within the multi-zone computing platform, a routing address, wherein the routing address includes information indicating where the at least one given data object is stored within the multi-zone computing platform; (iii) performing one or more validation operations on the request to access the at least one given data object; (iv) based on performing the one or more validation operations, determining that the request to access the at least one given data object is valid and should be allowed; (v) based on the routing address, making a determination of whether the at least one given data object is stored at the first zone of the multi-zone computing platform; and (vi) based on the determination, either (i) if the at least one given data object is stored at the first zone of the multi-zone computing platform, retrieving the at least one given data object from the first zone, or (ii) if the at least one given data object is stored at a second zone of the multi-zone computing platform that is different from the first zone, issuing a request to retrieve the at least one given data object from the second zone.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium having program instructions stored thereon that are executable to cause a computing system to carry out the functions disclosed herein, including but not limited to the functions of the foregoing method.

One of ordinary skill in the art will appreciate these as well as numerous other aspects in reading the following disclosure.

Figure 1:
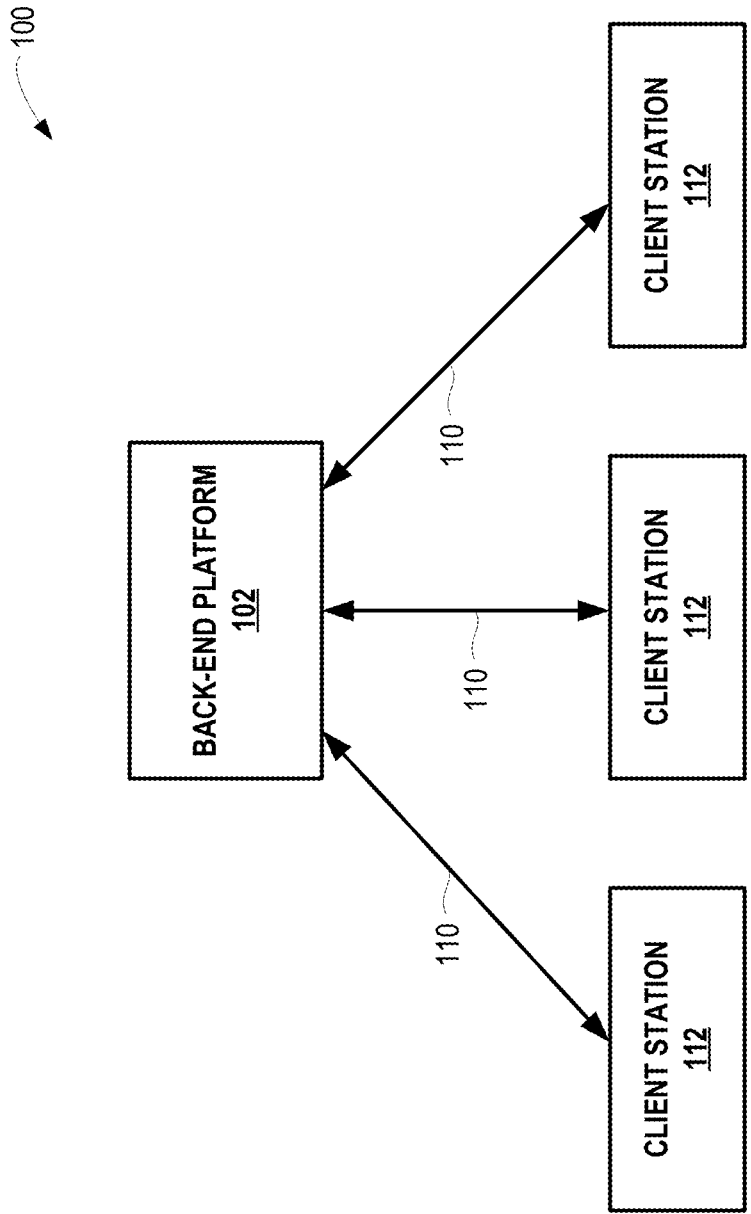
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As noted above, the present disclosure generally relates to technology for storing, managing, and accessing user data for a software application that is offered by a software provider such as Independent Software Vendor ("ISV") utilizing a Software as a Service ("SaaS") model. Under such a SaaS model, the software provider may operate a back-end computing platform (sometimes referred to as a "cloud" platform) that hosts a SaaS application and delivers it to users over a data network such as the Internet. In this respect, a SaaS application may include back-end software that runs on the back-end computing platform as well as front-end software that runs on a user's client station (e.g., in the form of a native application, a web application, and/or a hybrid application, etc.) and can be used to access the SaaS application and initiate creation of user data for the SaaS application, which is then typically stored at the back-end computing platform. As described in further detail below, this front-end and back-end software may carry out various functions and take any of various forms.

I. Example System Configuration

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, back-end computing platform 102 may comprise one or more computing systems that have been installed with back-end software (e.g., program code) for hosting a SaaS application and delivering it to users over a data network. The one or more computing systems of back-end computing platform 102 may take various forms and be arranged in various manners.

For instance, as one possibility, back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 102 may either supply its own cloud infrastructure or may obtain the cloud infrastructure from a third-party provider of "on demand" computing resources, such as Amazon Web Services (AWS), Google Cloud Platform (GCP), Microsoft Azure, or the like. As another possibility, back-end computing platform 102 may comprise one or more dedicated servers that have been provisioned with software for carrying out one or more of the functions disclosed herein. Other implementations of back-end computing platform 102 are possible as well.

Furthermore, as will be described in further detail below, back-end computing platform 102 may be a multi-zone computing platform comprising multiple different sets of discrete compute resources that are at least logically separated from one another, and in many cases, also physically separated from one another.

In turn, client stations 112 may each be any computing device that is capable of accessing the SaaS application hosted by back-end computing platform 102. In this respect, client stations 112 may each include hardware components such as a processor, data storage, a communication interface, and user-interface components (or interfaces for connecting thereto), among other possible hardware components, as well as software components that facilitate the client station's ability to access the SaaS application hosted by back-end computing platform 102 and run the front-end software of the SaaS application (e.g., operating system software, web browser software, mobile applications, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end computing platform 102 may be configured to interact with client stations 112 over respective communication paths 110. In this respect, each communication path 110 between back-end computing platform 102 and one of client stations 112 may generally comprise one or more communication networks and/or communications links, which may take any of various forms. For instance, each respective communication path 110 with back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end computing platform 102 may be wireless, wired, or some combination thereof, and may carry data according to any of various different communication protocols. Although not shown, the respective communication paths 110 between client stations 112 and back-end computing platform 102 may also include one or more intermediate systems. For example, it is possible that back-end computing platform 102 may communicate with a given client station 112 via one or more intermediary systems, such as a host server (not shown). Many other configurations are also possible.

While FIG. 1 shows an arrangement in which three client stations are communicatively coupled to back-end platform 102, it should be understood that this is merely for purposes of illustration and that any number of client stations may communicate with back-end platform 102.

Although not shown in FIG. 1, back-end computing platform 102 may also be configured to interact with other third-party computing platforms, such as third-party computing platforms operated by organizations that have subscribed to the SaaS application and/or third-party computing platforms operated by organizations that provide back-end computing platform 102 with third-party data for use in the SaaS application. Such computing platforms, and the interaction between back-end computing platform 102 and such computing platforms, may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing System

Figure 2:
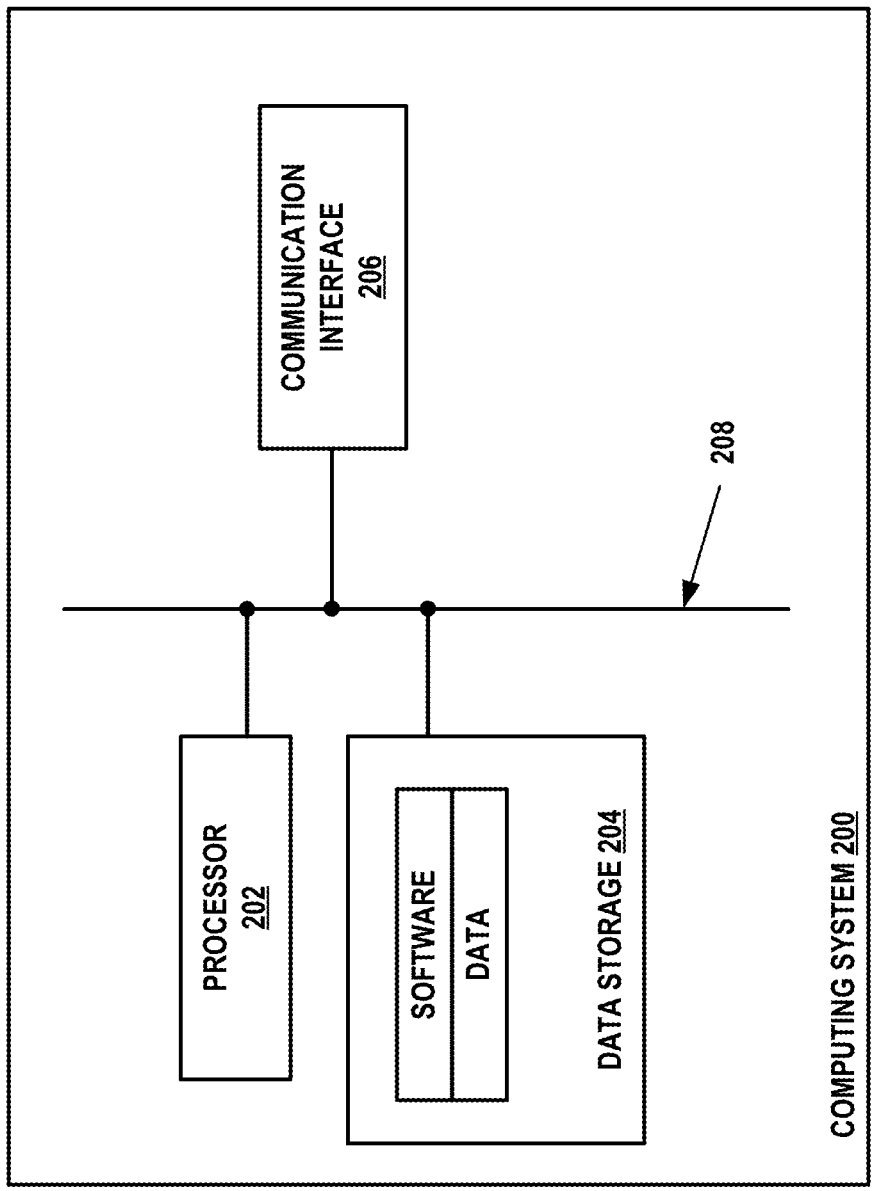
FIG. 2 depicts an example computing system that may be configured to carry out one or more of the functions according to the disclosed technology.

FIG. 2 is a simplified block diagram illustrating some structural components that may be included in an example computing system 200 that may be part of a zone of a back-end computing platform for a SaaS application (e.g., back-end computing platform 102 of FIG. 1). As shown in FIG. 2, example computing system 200 may include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processing components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that computing system 200 is configured to perform certain functions in connection with a SaaS application, which may be arranged together into engineering artifacts or the like, and (ii) data that may be received, derived, or otherwise stored, for example, in one or more databases, file systems, or the like, by computing system 200 in connection with a SaaS application. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with client stations (e.g., one or more client stations 112 of FIG. 1) and/or third-party computing platform. Additionally, in an implementation where computing system 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, and/or any other interface that provides for wireless and/or wired communication. Communication interface 206 may also include multiple communication interfaces of different types. Other configurations are possible as well.

Although not shown, computing system 200 may additionally include or have an interface for connecting to user-interface components that facilitate user interaction with computing system 200, such as a keyboard, a mouse, a trackpad, a display screen, a touch-sensitive interface, a stylus, a virtual-reality headset, and/or speakers, among other possibilities.

It should be understood that computing system 200 is one example of a computing system that may be used with the embodiments described herein. Numerous other arrangements are possible and contemplated herein. For instance, other computing systems may include additional components not pictured and/or more or fewer of the pictured components.

III. Example Operations

As mentioned above, the present disclosure generally relates to technology for storing, managing, and accessing user data for a SaaS application that is hosted by a back-end computing platform, such as back-end platform 102 of FIG. 1.

Typically, user data for a SaaS application is stored by the back-end computing platform in a centralized manner at one or more physical computing systems residing at a single physical location, such as a single data center. This approach of storing user data for a SaaS application in a centralized manner may provide various advantages, such as an increased ease in management of hardware and data stored on that hardware, increased control on data protection, including physical access to the storage site, reduced data redundancy, and reduced overhead maintenance costs, as some examples. However, the typical approach of storing such user data in a centralized manner also has several drawbacks and limitations.

As one example, storing user data in a centralized manner within one or more physical computing systems residing at a single physical location may impede compliance with laws (referred to herein as data export regulations) that govern how user data for a SaaS application should be stored and/or how access to user data that is stored at that single physical location should be managed. In this regard, different data export regulations may apply to different geographical regions. For instance, the International Traffic in Arms Regulations ("ITAR") prohibits the transfer of certain data pertaining to the United States Department of Defense from the United States to a foreign destination, and the General Data Protection Regulation ("GDPR") imposes certain privacy and security obligations on any organization (e.g., a service provider that offers a SaaS application to European users) that collects or processes personal data of European users. Many other data export regulations exist.

Because of such data export regulations, a back-end computing platform that is configured to store all user data for a SaaS application in a centralized manner at a single physical location faces certain disadvantages. For example, if data export regulations dictate that user data stored at that single physical location may not be accessed by users in a different physical location, those users may be unable to access any user data and may even be unable to utilize the SaaS application at all, which is undesirable. That, in turn, may force a need for the SaaS application provider to develop one or more different region-specific versions of the SaaS application for those users in different physical locations from the single physical location, which in turn, presents additional disadvantages. For instance, the SaaS application provider would be required to develop, maintain, and provide support for one or more different, independent versions of the SaaS application, which is undesirable from a provider perspective, and being required to use different versions of the SaaS application may impede collaboration between users in different physical locations, which is undesirable from a user perspective.

As another example, storing user data in a centralized manner at one or more physical computing systems residing at a single physical location requires various different users of the SaaS application—who are likely to be located across various different physical locations across the world—to access data from a single physical location, which may result in increased network congestion and/or unnecessary delays between the time of requesting data and the time of being provided access to the requested data, thereby resulting in an undesirable user experience.

As yet another example, storing user data in a centralized manner at one or more physical computing systems residing at a single physical location increases the risk of a single point of failure—that is, in the event of malfunction at the single physical location (e.g., loss of power), the entirety of the user data that is stored at that single physical location may become inaccessible, thereby resulting in an undesirable user experience.

One possible way to overcome these drawbacks of storing user data for a SaaS application in a centralized manner is by distributing the storage of user data for the SaaS application across multiple different physical computing systems that reside at multiple different physical locations within the world (e.g., either in the same country or different countries), which may provide several advantages over the typical approach of storing user data in a centralized manner.

As one example, distributing the storage of user data for a SaaS application across multiple different physical computing systems residing at multiple different physical locations may enable a back-end computing platform running the SaaS application to appropriately handle storing, managing, and accessing of user data in accordance with applicable data export regulations.

As another example, distributing the storage of user data for a SaaS application across multiple different physical computing systems residing at multiple different physical locations may enable storage of user data at a location that is in closer proximity to one or more physical locations from where the user data is most likely to be accessed, thereby reducing potential delays between the time the user data is requested to be accessed and the time the user data is provided for access.

As yet another example, distributing the storage of user data for a SaaS application across multiple different physical computing systems residing at multiple different physical locations may eliminate a need to provide multiple different versions of the SaaS application for users located in different physical locations.

Still, as another example, distributing the storage of user data for a SaaS application across multiple different physical computing systems residing at multiple different physical locations may enable easy expansion of the SaaS application to service users in additional physical locations by installing additional sets of discrete compute resources in the additional physical locations.

Other advantages of distributing the storage of user data for a SaaS application may also exist.

In order to implement a SaaS application for which user data is stored in a distributed manner at multiple different physical locations, the back-end computing platform for the SaaS application may comprise multiple different sets of discrete compute resources that are at least logically separated from one another, and in many cases, also physically separated from one another. In such an arrangement, each different set of logically-separated compute resources may be referred to as a "zone," and the back-end computing platform itself may be referred to as a "multi-zone" computing platform.

One possible example of such a multi-zone computing platform may comprise multiple different zones that each comprises a discrete set of logically-separated compute resources (e.g., a single computing system or multiple, interconnected computing systems) residing at a different physical location, which will now be described in more detail with respect to FIG. 3.

Figure 3:
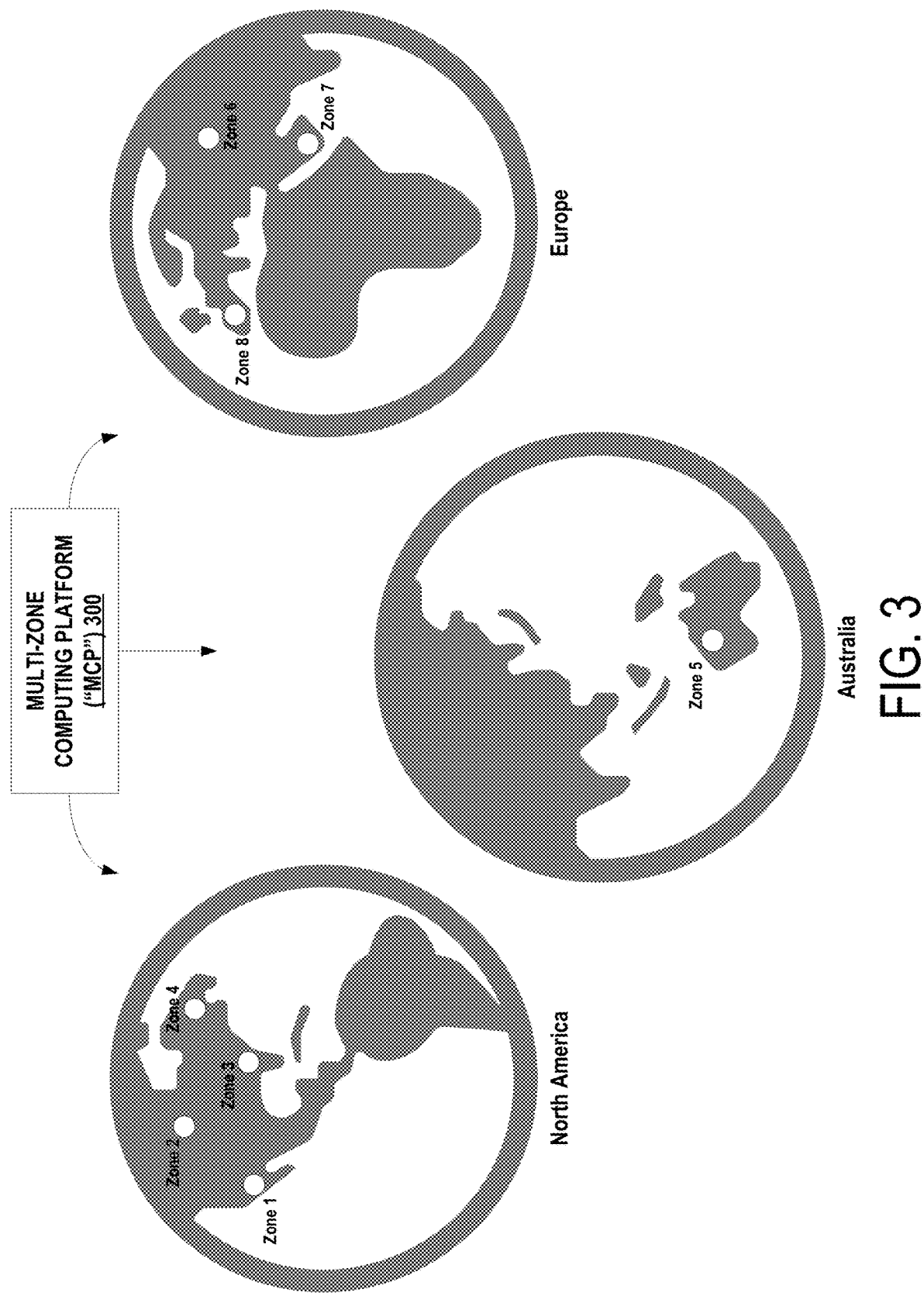
FIG. 3 depicts an example multi-zone computing platform that is configured to store data in a distributed manner.

FIG. 3 depicts an example multi-zone computing platform ("MCP") 300 that has multiple different zones, each zone comprising a discrete set of logically-separated compute resources. The MCP 300 may comprise any number of zones. As shown in FIG. 3, the MCP 300 may have at least eight different zones across different countries and continents. For example, the MCP 300 may have four different zones residing at four different locations in North America, which are depicted in FIG. 3 as Zone 1, Zone 2, Zone 3, and Zone 4. Further, the MCP may have a zone residing at a location in Australia, which is depicted in FIG. 3 as Zone 5. Further yet, the MCP 300 may have three different zones residing at three different locations in Europe, which are depicted in FIG. 3 as Zone 6, Zone 7, and Zone 8. The MCP 300 may also include one or more other zones not shown in FIG. 3.

In practice, the user data for the SaaS application that is created and stored by the multi-zone computing platform disclosed herein may comprise a collection of data objects that are created and stored by the multi-zone computing platform based on input from the various users of the SaaS application, where such data objects could take any of various different forms depending on the nature of the SaaS application. Further, in practice, the data objects that are created and stored by the multi-zone computing platform could have various different relationships between them, where such relationships could take any of various different forms depending on the nature of the SaaS application.

As one example to illustrate, if the SaaS application takes the form of a cloud-based construction management SaaS application (such as the one offered by Procore Technologies, Inc.), the data objects that are created and stored by a multi-zone computing platform for the SaaS application may include "company" data objects that encode information about companies that have subscribed to the SaaS application (e.g., general contractors, subcontractors, vendors, etc.), "user" data objects that encode information about individual users of the SaaS application (e.g., employees of the companies that have subscribed to the SaaS application), "project" data objects representing construction project workspaces that have been created to organize the user data that is stored by the multi-zone computing platform for the cloud-based construction management application, and then data objects of various other types representing different types of data items related to a construction project. Such other types of data objects may include, as some examples, Request for Information, or "RFI" data objects that have been created to request and/or provide information about given tasks for the construction project, "punch list" data objects that memorialize punch items on the construction project, "observation" data objects that have been created to memorialize observations made during on-site inspections of the construction project, and "instruction" data objects that memorialize various types of instructions (e.g., architect instructions, site instructions, etc.) for the construction project, among various other examples.

Further, these different types of data objects could have defined relationships between them that are based on relationships between companies and individual users, relationships between different companies, relationships between different individual users, relationships between companies and construction projects, relationships between companies and individual data objects, relationships between individual users and construction projects, relationships between individual users and individual data objects, and/or relationships between construction projects and individual data objects, among other possibilities.

As another example to illustrate, if the SaaS application takes the form of a cloud-based data storage SaaS application (such as the ones offered by Dropbox, Google, Microsoft, etc.), the data objects that are created and stored by a multi-zone computing platform for the SaaS application may include "company" data objects that encode information about companies that have subscribed to the SaaS application (e.g., companies that have a business-level subscription for the cloud storage application), "user" data objects that encode information about individual users of the SaaS application (e.g., personal users or employees of companies that have a business-level subscription for the cloud storage application), "folder" data objects representing folders that have been created to organize the user data that is stored by the multi-zone computing platform for the cloud-based data storage application, and then data objects of various other types representing the different types of data items that are stored by the multi-zone computing platform for the cloud-based data storage application.

Further, these different types of data objects could have defined relationships between them that are based on relationships between companies and individual users, relationships between different companies, relationships between different individual users, relationships between companies and folders, relationships between companies and individual data items, relationships between individual users and folders, relationships between individual users and individual data items, and/or relationships between folders and individual data objects, among other possibilities.

The user data for a SaaS application that is created and stored by the multi-zone computing platform disclosed herein may take various other forms as well.

As noted above, the multi-zone computing platform disclosed herein may store the data objects for the SaaS application in a distributed manner across the multiple different zones of the multi-zone computing platform, which may provide various advantages over the typical approach of storing such data objects in a centralized manner. In this respect, the specific manner in which the different data objects are distributed across the multiple different zones of the multi-zone computing platform could take any of various forms.

As one possibility, the particular zone where a data object is stored within the multi-zone computing platform may be selected based at least in part on a location of a user that initiated creation of the data object and/or a company that employs the user. For instance, user data created based on input provided by a user that is located in (or employed by a company located in) the United States may be stored at a zone that resides in the United States, user data created based on input provided by a user that is located in (or employed by a company located in) Australia may be stored at a zone located in Australia, user data created based on input provided by a user that resides in (or employed by a company located in) Europe may be stored at a zone that resides in Europe, and so on. Further, in a scenario where the multi-zone computing platform includes multiple zones within a single geographic region (e.g., a single country), the location of the user that initiated creation of the user data and/or the company that employs the user could also be used as a basis for selecting between the different zone options within that geographic region when storing user data created by the user.

As another possibility, the particular zone where a data object is stored within the multi-zone computing platform may be selected based at least in part on the nature of the data object being stored (e.g., some types of data objects may be stored in one zone while other types of data objects may be stored in another zone). For instance, in a scenario where the multi-zone computing platform includes multiple zones within a single geographic region (e.g., a single country), the data objects may be distributed across the different zones within that geographic region based on data object type and/or the manner in which the data objects have been organized by the users (e.g., the projects with which the data objects are associated), among other possibilities.

The manner in which the multi-zone computing platform distributes storage of the user data for a SaaS application could take various other forms as well.

Although distributing storage of user data for a SaaS application across different zones of a multi-zone computing platform provides several advantages, such a configuration also presents additional technical challenges in terms of how to handle management of and/or access to the user data.

To help address these challenges, disclosed herein is new technology that enables management and access of user data for a SaaS application that has been stored in a distributed manner across multiple different zones of a multi-zone computing platform.

a. Global Representation

In accordance with one aspect of the disclosed technology, the multi-zone computing platform may maintain a "global representation" of all available user data for the SaaS application that provides an indication of where each data object is stored within the multi-zone computing platform, which may be available for access by every zone of the multi-zone computing platform, and when a given zone of the multi-zone computing platform receives a request from a client station to access a data object that is stored within the multi-zone computing platform, the given zone may obtain and use information from this global representation in order to route the request to the appropriate zone of the multi-zone computing platform.

At a high level, the global representation of available user data for a SaaS application may include (i) a respective set of object metadata for each available data object that is stored within the multi-zone computing platform and perhaps also (ii) "relationship" metadata that provides information about the relationships (i.e., the logical connections) between data objects stored within the multi-zone computing platform. Each of these categories of metadata may take various forms.

For instance, in the global representation of the available user data for the SaaS application, the respective set of object metadata for a data object may include certain metadata fields that provide a baseline set of information about the data object that can be used by a zone when handling a request to access the data object. These metadata fields could take various forms.

As one possibility, the set of object metadata for a data object may include a metadata field that contains a unique identifier for the data object, which may comprise a combination of numeric and/or alphabetical characters.

As another possibility, the set of object metadata for a data object may include a metadata field that contains an indication of the type of data object (e.g., company data object, user data object, project data object, some other specific type of data object as previously discussed, etc.). In this regard, the indication of the type of data object may take various forms and may also include multiple parts that indicate different data object type categories for the data object (e.g., the metadata field indicating the type of data object for an individual user data object may include additional categories indicating information about the name of the user, the company where the user is employed, and the user's role and/or job description at the company; the metadata field indicating the type of data object for an RFI data object may include additional categories indicating information about a title, an RFI number, and/or a description of the RFI, etc.).

As yet another possibility, the set of object metadata for a data object may include a metadata field that contains an identifier of a storage location of the data object within the multi-zone computing platform, which may also be referred to herein as the "routing address" for the data object. In accordance with the present disclosure, such a routing address may comprise a combination of multiple different data elements that collectively serve to identify the storage location of the data object within the multi-zone computing platform.

For instance, according to one implementation, a routing address for a data object may comprise (i) a first data element that identifies a particular partition where the data object is stored within the multi-zone computing platform, (ii) a second data element that identifies a provider of the particular computing resources utilized by the multi-zone computing platform to store the data object (e.g., AWS, GCP, Azure, etc.), (iii) a third data element that identifies a particular zone of the multi-zone computing platform where the data object is located, (iv) a fourth data element that identifies a particular back-end service (e.g., a microservice) that was used to create (and can be used to retrieve) the data object, and (v) a fifth data element that identifies the data object itself, among other possibilities. However, it should be understood that this combination of data elements is merely provided as one example of a routing address, and that a routing address of a data object could take various other forms as well—including the possibility that the foregoing data elements could be arranged in any of various different orders and that the particular set of data elements included in the routing address could also be changed in various ways (e.g., by removing, replacing, or adding data elements).

A first illustrative example of a routing address for a data object stored within a multi-zone computing platform for a construction management SaaS application offered by the Procore Technologies, Inc. is shown here:

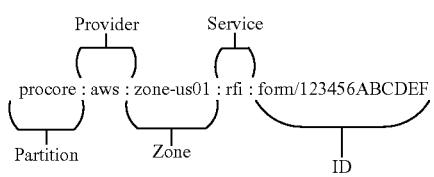

First Example Routing Address

As shown, this first example routing address may comprise a combination of data elements that collectively define a storage location for the data object, where each successive data element may provide more specific information than its preceding data element.

More particularly, the first example routing address begins with a "Partition" data element that identifies the particular partition where the data object is stored within the multi-zone computing platform, and in this example, the partition is identified as "Procore" (i.e., the provider of the SaaS application)—which indicates that the data object is stored within a main partition of the SaaS application. This "Partition" data element is useful in a scenario where the multi-zone computing platform as a whole has been divided into multiple separate partitions in order to logically isolate one part of the multi-zone computing platform from another, which may help to achieve heightened security of certain user data for the SaaS application relative to other user data. For example, if one of the subscribers of a SaaS application is a federal government contractor that has a need for heightened security, that federal government contractor may ask to have its own partition of the multi-zone computing platform so that user data created by users associated with the federal government contractor is isolated from user data created by other users. Partitions within the multi-zone computing platform may be created for other reasons as well.

Next, the first example routing address includes a "Provider" data element that identifies a provider of the particular compute resources utilized by the multi-zone computing platform to store the data object, and in this example, the provider is identified as "AWS," which indicates that computing resources provided by Amazon Web Services are being utilized by the multi-zone computing platform to store the data object.

Next, the first example routing address includes a "Zone" data element that identifies a particular zone of the multi-zone computing platform where the data object is located, and in this example, the zone is identified as "zone-us01," which indicates that the data object is stored in one particular zone located in the United States.

Next, the first example routing address includes a "Service" data element that identifies a particular back-end service (e.g., a microservice) that was used to create the data object and can likewise be used to access the data object, and in this example, the service is identified as "RFI," which indicates that the data object was created using an RFI microservice that is implemented as part of the back-end software for the SaaS application.

Lastly, the first example routing address includes an "ID" data element that specifies an identifier of the data object itself, and in this example, the identifier of the data object is specified as "form/12346ABCDEF" for purposes of illustration.

While the first example routing address illustrates one possible form that a routing address may take, it should be understood that, as noted above, the routing address may take other forms as well.

Further, while some example metadata fields that may be included in the set of metadata for a data object have been described above, it should be understood that the set of metadata for a data object may include other information as well.

As noted above, in addition to the respective set of metadata for each available data object, the global representation of the available user data for the SaaS application may also include relationship metadata that provides information about the relationship (i.e., logical connections) between data objects stored within the multi-zone computing platform. This relationship metadata may also take various forms.

As one possibility, relationship metadata for a data object may indicate any other data object that has a relationship with the data object. For example, relationship metadata may indicate that data object A has a respective relationship with data object B and data object C.

As another possibility, relationship metadata may additionally include permissions data that defines information about permitted access to user data. For example, permissions data may define, for each data object that is related to a given user, whether the given user has permission to access that data object, and if so, to what extent (e.g., what are the given user's permissible actions with respect to that data object). For instance, permissions data may indicate that a given user's access permissions for a first data object include read and edit permissions for the first data object and the given user's access permissions for a second data object include read-only permissions for the second data object. As another example, permissions data may define, for each data object, whether the data object is subject to any data export regulations that may impact access to that data object by certain users.

The relationship metadata may include other types of information as well.

The global representation of available user data for a SaaS application may include other kinds of data as well.

Further, the global representation of available user data for a SaaS application disclosed herein may be embodied in various forms. As one possibility, the global representation may be embodied in the form of a connected graph (or network), where the respective sets of object metadata for the data objects may be embodied as respective nodes within the connected graph, and the relationship metadata may be embodied as links between the nodes of the connected graph. As another possibility, the global representation may be embodied in the form of a database or a set of one or more linked databases containing the respective sets of object metadata and/or relationship information for the data objects stored by the multi-zone computing platform. As yet another possibility, the global representation may be embodied in a combination of different forms. The global representation may take other forms as well.

Notably, while the global representation of available user data for a SaaS application is preferably arranged to provide information about all available data objects that are stored within the multi-zone computing platform (or at least the majority of available data objects), it is also generally intended to be a lightweight resource that preferably includes only a baseline set of metadata that enables a zone of the multi-zone computing platform to evaluate and handle access requests for data objects.

Figure 4:
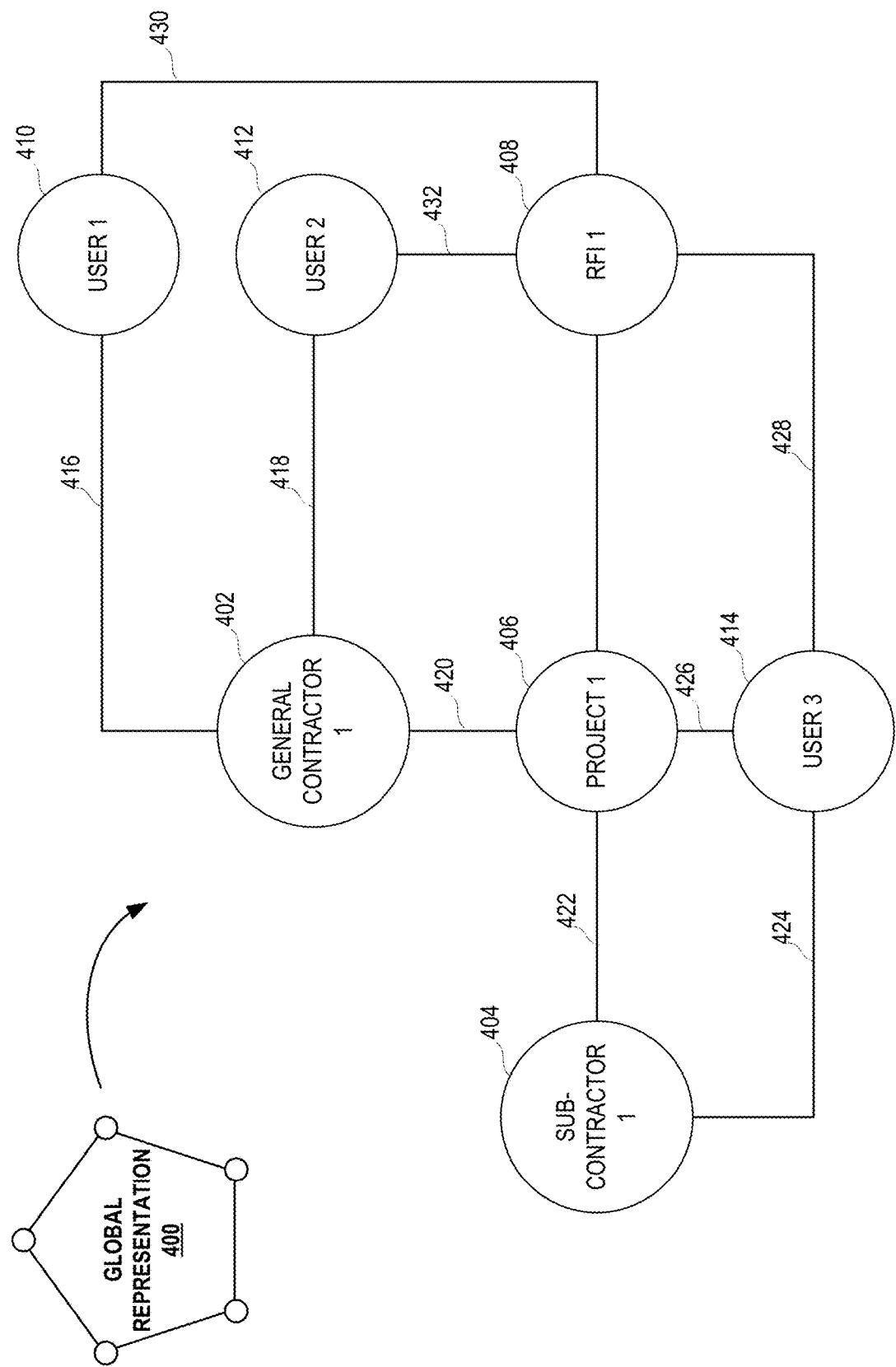
FIG. 4 depicts an example global representation that is configured to provide metadata for data stored in the example multi-zone computing platform of FIG. 3.

One example of a global representation that may be embodied in the form of a connected graph as described above is shown in FIG. 4. FIG. 4 depicts an example global representation 400 of user data stored within the MCP 300 that is embodied in a connected graph. The connected graph embodies nodes 402-414 that represent different data objects stored within the MCP 300. For instance, node 402 represents a company data object identified as General Contractor ("GC") 1, node 404 represents a company data object identified as Subcontractor ("SC") 1, node 406 represents a project data object identified as "Project 1," node 408 represents an RFI data object identified as "RFI 1," node 410 represents a user data object identified as "User 1," node 412 represents a user data object identified as "User 2," and node 414 represents a user data object identified as "User 3." Although not specifically shown in FIG. 4, each of the nodes 402-414 may comprise a respective set of object metadata that includes a data object identifier, a data object type, and a routing address.

Further, the connected graph of FIG. 4 includes links 416-430 that embody the relationships (e.g., the logical connections) between the nodes 402-414. FIG. 4 depicts a portion of the connected graph that embodies the various relationships between nodes 402-414. For instance, node 402 for GC 1 is connected to node 410 for User 1, node 412 for User 2 and node 406 for Project 1 as shown by links 416, 418, and 420, respectively, indicating a logical relationship between GC1 and each of User 1, User 2, and Project 1. For example, User 1 and User 2 may be users that are associated with GC 1 by virtue of being employees of GC 1, and Project 1 may be associated with GC 1 by virtue of GC 1 managing that project.

Node 404 for SC 1 is connected to node 406 for Project 1 and node 414 for User 3, as shown by links 422 and 424, respectively, indicating a logical relationship between SC 1 and each of Project 1 and User 3. For example, User 3 may be a user that is associated with SC 1 by virtue of being an employee of SC 1, and Project 1 may be associated with SC 1 by virtue of SC 1 being contracted to work on that project.

Node 414 for User 3 is further connected to Project 1 and RFI 1 as shown by links 426 and 428, respectively, indicating a logical relationship between User 3 and each of Project 1 and RFI 1. For example, User 3 may be a user that is associated with Project 1 by virtue of being assigned to Project 1 and may be associated with RFI 1 by virtue of having initiated creation of RFI 1. Although not shown, the connected graph of FIG. 4 may also include, as part of the relationship metadata for User 3, Project 1, and RFI 1, permissions data that indicates User 3's access permissions with respect to each of Project 1 and RFI 1.

Finally, node 408 for RFI 1 is further connected to node 410 for User 1 and node 412 for User 2 as shown by links 430 and 432, respectively, indicating a logical relationship between RFI 1 and each of User 1 and User 2. For example, Users 1 and 2 may be users that are associated with RFI 1 by virtue of having been invited to edit RFI 1. Although not shown, the connected graph of FIG. 4 may also include, as part of the respective relationship metadata for User 1 and User 2, permissions data that indicates access permissions for each of User 1 and User 2 with respect to RFI 1.

The portion of the global representation 400 may also indicate other information about the relationships between the nodes 402-414 that are not shown in FIG. 4. As mentioned above, FIG. 4 depicts only a portion of an example global representation 400 that takes the form of a connected graph that is stored within a multi-zone computing platform, such as the MCP 300. In alternative implementations, it is possible that the global representation 400 may take other forms.

As noted above, in practice, the global representation may be stored by the multi-zone computing platform in a manner that enables access to the global representation by each zone of the multi-zone computing platform, which may take various forms. To accomplish this, in one implementation, the global representation may be stored at a single designated zone within the multi-zone computing platform, and while that designated zone may then be able to access the global representation directly, the other one or more zones of the multi-zone computing platform may then access and obtain information from the global representation by communicating with the designated zone via a data network (e.g., by issuing a request to the designated zone for information from the global representation and then receiving the requested information back from the designated zone). Alternatively, in another implementation, a mirrored copy of the global representation may be stored at each different zone within the multi-zone computing platform (or at least each of multiple different zones) such that each zone may access the global representation without being required to communicate with another zone over a data network in order to access the global representation. In such an implementation, the multi-zone computing platform may also employ additional technology that keeps the mirrored copies of the global representation stored at the different zones in "synchronization" with one another (e.g., by pushing updates to each zone and periodically performing comparisons between mirrored copies) so that each such mirrored copy generally provides the same global representation of available user data.

Figure 5:
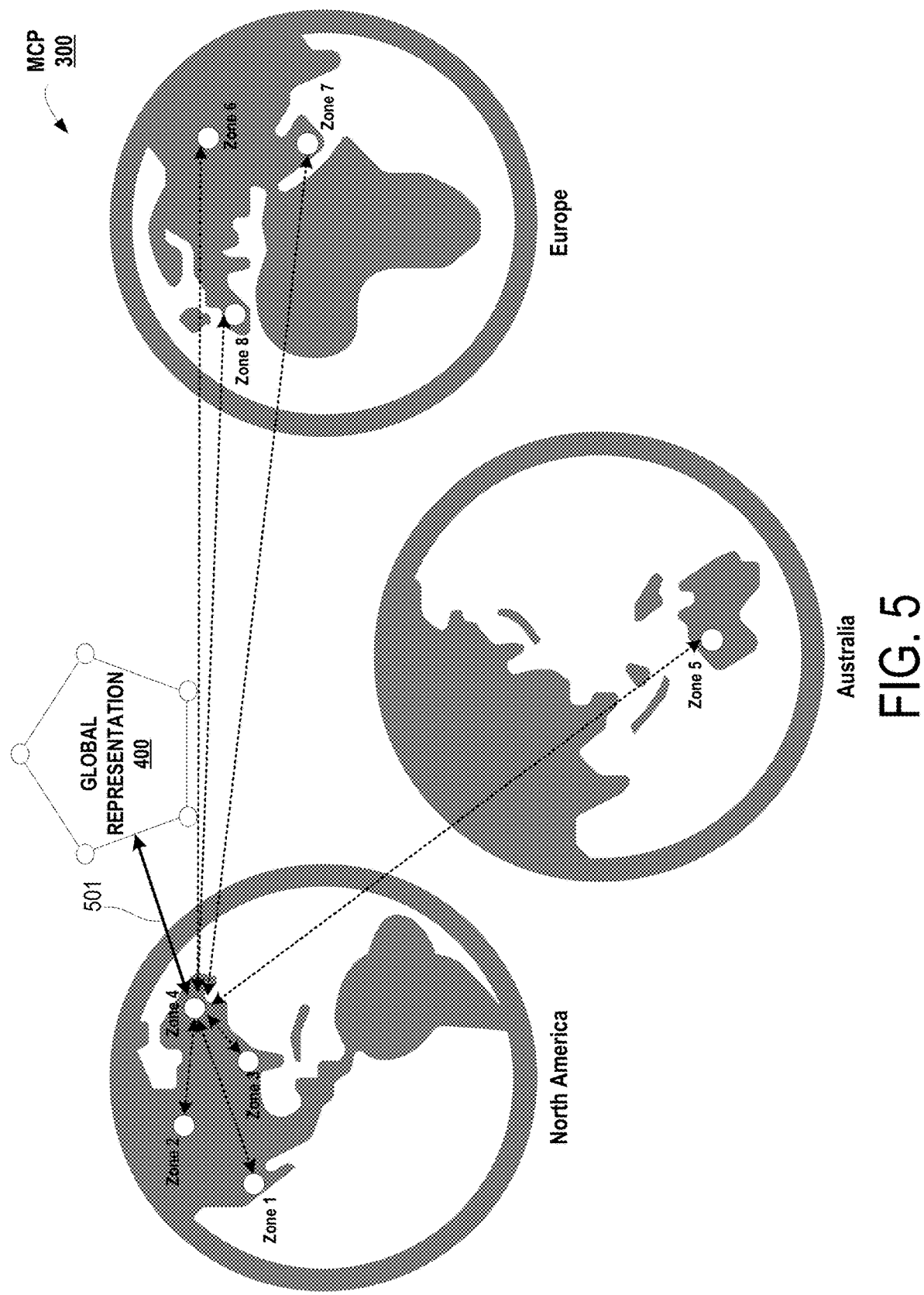
FIG. 5 depicts an example configuration of how the global representation of FIG. 4 may be stored within the multi-zone computing platform of FIG. 3.

With reference now to FIG. 5, one example of how an example global representation, such as global representation 400, may be stored by the MCP 300 is shown. FIG. 5 depicts an implementation where the global representation 400 is stored at a designated zone of the MCP 300. Advantageously, as compared to an implementation where the global representation is mirrored across multiple zones, an implementation where the global representation of user data is stored at a designated zone eliminates the need to ensure that each mirrored copy of the global representation is accurately and synchronously updated across the all zones each time the global representation is changed (e.g., each time a new data object is created, an existing data object is deleted, or metadata for a data object is modified, etc.).

As shown in FIG. 5, a solid double arrow 501 represents a direct access path between Zone 4 and the global representation 400, indicating that Zone 4 is the designated zone of MCP 300 at which the global representation 400 is stored. When Zone 4 needs to obtain information from the global representation 400, it may do so by directly accessing the global representation 400. As further shown in FIG. 5, a respective dashed double arrow between Zone 4 and each of the other zones, Zones 1-3 and Zones 5-8, represents an indirect access path from each other zone to the global representation 400 by way of the designated zone, Zone 4. When any one of the other zones needs to obtain information from the global representation 400, it may do so by issuing a request to Zone 4 for the desired information. Zone 4 may then retrieve the information from the global representation 400 and return that information to the other zone that issued the request.

b. Techniques for Processing and Routing Data Access Requests

In accordance with another aspect of the disclosed technology, disclosed herein are example techniques for processing a request to access user data using information that is obtained from the global representation. In this respect, each zone of a multi-zone computing platform as disclosed herein may be configured such that, when the zone receives a request from a client station to access certain user data that is stored within the multi-zone computing platform, the zone may obtain and utilize information from a global representation of user data stored within the multi-zone computing platform to (i) determine if the data access request is allowed and (ii) if the data access request is allowed, route the request to an appropriate zone of the multi-zone computing platform (if the appropriate zone is different from the zone that received the request) and then provide the user data to the client station.

In practice, the multi-zone computing platform may receive such a request to access certain user data from any one of a plurality of client stations that is configured to communicate with the multi-zone computing platform as previously described. The client station may be configured to provide access to a SaaS application that is hosted by the multi-zone computing platform, which as noted above could take any of various forms.

Further, in practice, the requested user data may comprise any one or more data objects that are stored within the multi-zone computing platform. For example, a user of the construction management SaaS application may input a request to view or modify a single data object, such as a given RFI, which may then trigger the user's client station to send the multi-zone computing platform a request to access that single data object. As another example, the user may input a request to view or modify multiple data objects, such as all of the construction projects to which the user is currently assigned, which may then trigger the user's client station to send the multi-zone computing platform a request to access the multiple data objects. Many other examples are possible as well.

The request to access the user data that is sent by the client station to the multi-zone computing platform, referred to herein as the "data access request," may then be received by one particular zone of the multi-zone computing platform, referred to herein as the "receiving zone," which will generally be the zone that is physically closest to the location of the client station (or a zone that is at least in the same geographic region as the client station). Upon receiving the data access request, the receiving zone of the multi-zone computing platform may then obtain and utilize information from the global representation of the available user data for the SaaS application to (i) determine if the data access request is allowed and (ii) if the data access request is allowed, retrieve the requested data or route the request to the appropriate zone of the multi-zone computing platform and then provide the retrieved user data to the client station to be displayed to the user. These functions will now be discussed in more detail with respect to FIGS. 6 and 7.

Figure 6:
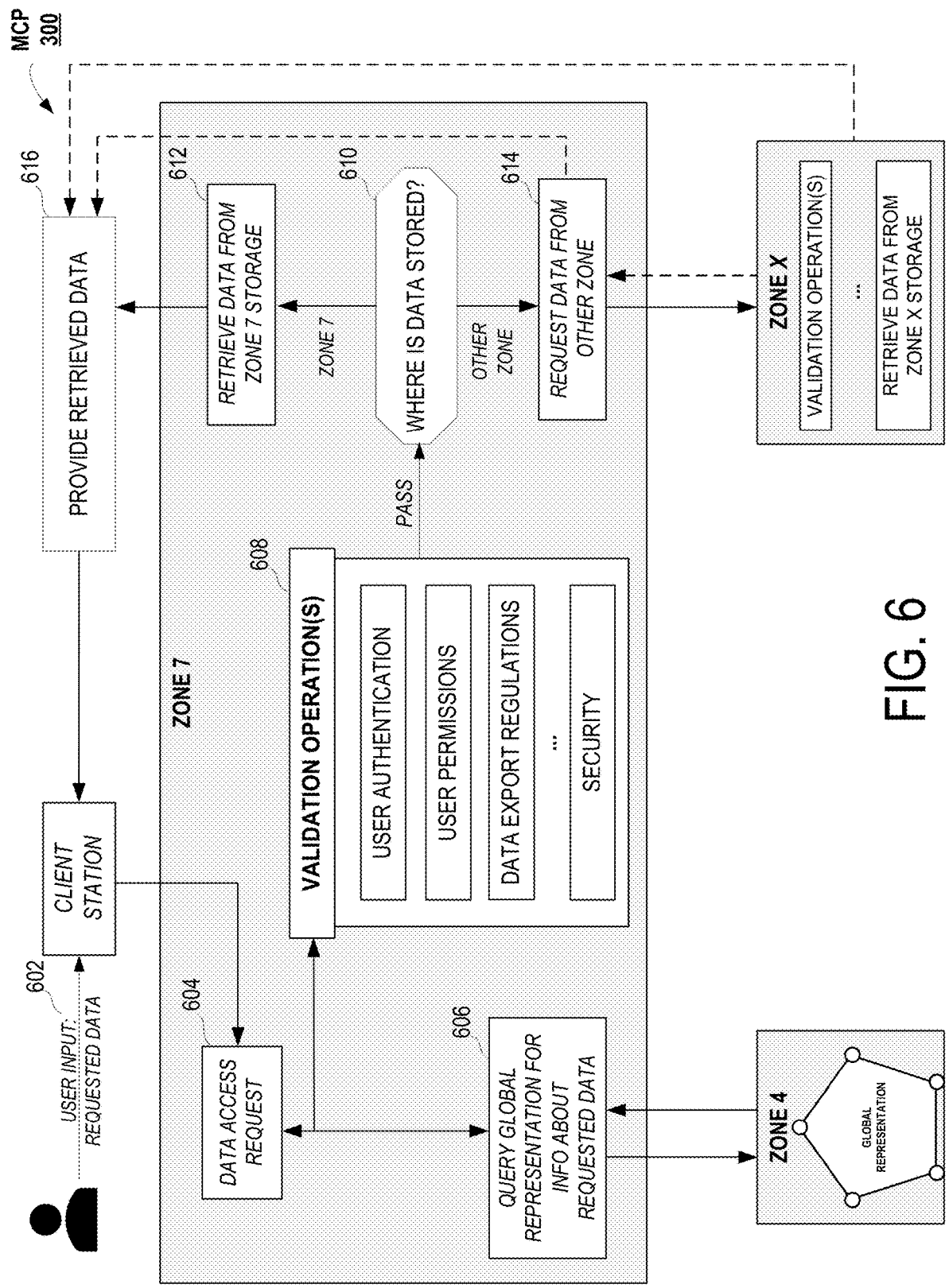
FIG. 6 depicts example interactions between one or more zones of the multi-zone computing platform of FIG. 3.

FIG. 6 depicts one example of the interactions that may occur between different zones of an example multi-zone computing platform, such as the MCP 300, in order to process a data access request that is received by the MCP 300. In the example of FIG. 6, at 602, a user may input a request to access certain user data, which may comprise one or more data objects, at a client station using a front-end interface of the SaaS application hosted by the MCP 300. The client station may be any one of various types of computing devices previously discussed, including a desktop, a laptop, a smartphone, or a tablet. The request input by the user at the client station may trigger the client station to send a data access request for the user data to the MCP 300.

At 604, the MCP 300 may receive the data access request from the client station. As mentioned above, the MCP 300 may receive the data access request at one particular receiving zone, which may be a zone that is physically nearest to the location of the client station (or at least in the same geographic region as the client station). In the example of FIG. 6, the receiving zone is Zone 7. In practice, the receiving zone may receive the data access request in various ways, including via an Application Programming Interface ("API") of the receiving zone. However, the receiving zone may receive the data access request in other ways as well.

The data access request that is received from the client station may include various information about the requested access to the user data. For instance, as one possibility, the data access request may include some form of identifying information for the user that input the request to access the user data at the client station. This identifying information for the user may take any one of various forms, such as a user identifier, a username, a user token, or any combination thereof, among other possibilities. As another possibility, the data access request may include some form of identifying information for the user data for which access is being requested, which can be used to reference the user data in the global representation. This identifying information could take various forms. As one example, the identifying information may take the form of a unique object identifier of each data object for which access is requested (e.g., an RFI ID for a given RFI that was requested by the user at 602). As another example, the identifying information may take the form of a certain type, a certain category, or a certain grouping of data objects, each of which may take various forms. As another possibility, the data access request may include information about the type of access that is being requested for the user data (e.g., view, edit, delete, etc.). Other examples are possible as well.

After receiving the data access request, Zone 7 may then function to obtain information about the user data from the global representation of available user data for the SaaS application, which as shown in FIG. 6 is stored at Zone 4. Thus, at 606, Zone 7 may issue a query to Zone 4 for information about the user data. The query to Zone 4 may include information specifying the user data for which access is being requested, which may be similar to the information that was by Zone 7 as part of the data access request at 604, a portion of that information, or derived information generated by Zone 7 based on the received information, among other examples.

Based on the information specifying the user data for which access is being requested, Zone 4 may obtain a respective set of metadata for at least one data object and then return that respective set of metadata to Zone 7. In this regard, Zone 4 may use the information specifying the user data for which access is being requested in various ways. As one example, if that information includes one or more unique data object identifiers, Zone 4 may use the one or more unique data object identifiers to look up one or more particular data objects in the global representation, obtain a respective set of metadata for each data object, and then return the obtained set(s) of metadata to Zone 7. As another example, if that information relating to the data access request includes one or more parameters, Zone 4 may conduct a query within the global representation using the query parameters and the relevant relationship metadata in order to obtain the set(s) of metadata. For example, if the query includes a request for information regarding all projects associated with a given user identifier, Zone 4 may (i) look up the given user identifier, (ii) determine, based on available relationship metadata for the given user, each project data object with which the given user has a relationship, (iii) obtain, from the global representation, a respective set of metadata for each project data object that is associated with the given user, and then (iv) return the obtained respective set(s) of metadata to Zone 7. Other examples are also possible.

In line with the discussion above, the respective set of metadata returned for each data object for which access is being requested may include at least a routing address that defines a storage location where the data object resides. Additionally, the respective set of metadata returned for each data object may also optionally include one or more of the other types of metadata previously discussed, such as a data object identifier, a data object type, and/or information about one or more relationships of the data object. The routing address, and optionally other metadata such as relationship(s) information, may be used thereafter by Zone 7 to process the data access request, as will be discussed in more detail further below.

After the respective set(s) of metadata for the user data is received at Zone 7, then, as shown at 608 of FIG. 6, a set of one or more validation operations may be performed for the data access request in order to determine if the requested access to the user data is allowed.

As one possibility, the one or more validation operations may include an authentication check that determines whether the user requesting access to the user data has been authenticated. To perform the authentication check, Zone 7 may use information included in the data access request received from the client station at 604 and/or the set(s) of metadata received from Zone 4 at 606, among other possibilities. In one implementation, for instance, the data access request that was received from the client station at 604 may include a token indicating whether or not the user was authenticated at the time of inputting the request to access the user data at 602. For example, the token may indicate that the user provided a correct username and password login combination at the time of inputting the request. Based on such a token (and/or based on other information such as a username and password), Zone 7 may determine that the authentication check has succeeded.

As another possibility, the one or more validation operations may include a permissions check that determines whether the user has permission to access the user data. To perform the permissions check, Zone 7 may use information included in the data access request received from the client station at 604 and/or the set(s) of metadata received from Zone 4 at 606, among other possibilities. In one implementation, for instance, the set(s) of metadata received from Zone 4 at 606 may include relationship metadata—which, as previously discussed, may include information about the relationship between the user requesting access to the user data and the user data as well as information about the user's access permissions with respect to the user data. Such relationship information may be used by Zone 7 to determine if the user has the permission to access the user data.

As yet another possibility, the one or more validation operations may include a data export regulations check that determines whether allowing the requested access to the user data would violate any relevant data export regulations. To perform the data export regulations check, Zone 7 may use information included in the data access request received from the client station at 604 and/or the set(s) of metadata received from Zone 4 at 606, among other possibilities. In one implementation, for instance, Zone 7 may determine the physical location of the client station and the physical location of the particular zone where the user data is stored, determine if any regional data export regulations apply to the user data based on the physical location of the particular zone, and then determine if allowing the client station to access the user data from the particular zone would violate any applicable regulations.

For instance, the physical location of the client station may be determined based on an indication of the client station's location included in the data access request received at 604, and the physical location of the particular zone where the user data is stored may be determined based on the routing address received as part of the set(s) of metadata from Zone 4 at 606. After determining these locations, Zone 7 may then determine if any data export regulations apply to the user data. In this regard, the export regulations that may be considered by the receiving zone while performing the data export regulations check may be established, globally recognized, regulatory regimes that dictate how data can be distributed across certain international geographical boundaries, such as ITAR and GDPR mentioned above.

Further, Zone 7 may make the determination of what, if any, data export regulations should be considered during performance of the data export regulations check in various ways. As one possibility, Zone 7 may reference previously stored information regarding each zone of the MCP 300, which may include information identifying a specific regional location for each zone, and any region-specific data export regulations that will apply to user data stored at that zone by the MCP 300. As another possibility, Zone 7 may send a query to the zone where the user data resides (if that zone is a zone other than Zone 7) that may include a request for information about any region-specific data export regulations that will apply to the user data. Other examples are also possible.

To illustrate with an example based on FIG. 6, as part of performing the data export regulations check at 608, Zone 7 may determine that (i) based on the routing address included in the metadata received from Zone 4, the user data resides at Zone 1 located in the United States, (ii) based on information included in the data access request received from the client station, the client station is located in the same geographical region as Zone 7 located in Europe, and (iii) United States data export regulations do not impose any restrictions on data stored in the United States being exported to Europe. Therefore, Zone 7 may determine that allowing the client station to access the user data will not violate any applicable data export regulations, and thus, the data export regulations check has succeeded. In another example not shown in FIG. 6, the receiving zone may be, for example, Zone 1, and while performing the data export regulations check, the receiving zone may determine that (i) based on the routing address included in the metadata obtained from Zone 4, the user data resides at Zone 7 located in Europe, (ii) based on information included in the data access request received from the client station, the client station is located in the same geographical region as Zone 1 located in the United States, and (iii) European data export regulations do not permit data stored in Europe to be exported to the United States Therefore, the receiving Zone 1 may determine that allowing the client station to access the user data will violate data export regulations, and thus, the data export regulations check has failed. Other examples are also possible.

Still, as another possibility, the one or more validation operations may include a security check that determines whether the request for access is indicative of suspicious activity (e.g., malicious or erroneous behavior). Such suspicious activity may be identified based on various factors, which may include, as some non-limiting examples, the type of access that is requested (e.g., deletion of confidential data, etc.) and/or the number of access requests made in a given amount of time (e.g., multiple requests from a same user within a short amount of time to delete a large amount of data, etc.), among other possibilities.

The receiving zone may also perform one or more additional validation operations not shown in FIG. 6 to determine if the requested access to the user data is valid and should be allowed.

The one or more validation operations discussed above may be performed in various ways. In some implementations, the validation operations may be performed in sequence, where each prior operation in the sequence serves as a threshold operation that must succeed in order for the next validation operation in the sequence to be performed. For example, the validation operations may be performed in a particular sequence that begins with the user authentication check, then if successful proceeds to the user permissions check, then if successful proceeds to the data export regulations check, and lastly if successful proceeds to the security check. Additionally, or alternatively, some validation operations may be performed in parallel (i.e., contemporaneously) with each other. In this regard, the validation operations that are performed contemporaneously may also collectively serve as threshold operations that must succeed in order for the receiving zone to proceed with performing one or more additional validation operations. For example, both of the user authentication and user permissions checks may serve as threshold operations that are performed in parallel and must both succeed in order for the receiving zone to proceed with performing one or more additional validation operations. Still additionally, or alternatively, the outcome of one or more validation operations may depend in whole or in part on the outcome of one or more other validation operations. The one or more validation operations may take various other forms as well.

The receiving zone may take various actions based on the outcomes of the one or more validation operations. As one possibility, the receiving zone may require each validation operation that is performed to succeed in order to continue processing the data access request. Thus, if even one validation operation fails, the receiving zone may deny the data access request altogether.

As another possibility, in the event that a validation operation fails, the receiving zone may apply one or more exceptions that enable the validation operation to succeed based on some additional action, thus allowing the receiving zone to continue processing the data access request. For instance, in some implementations, if certain one or more validation operations fail, the receiving zone may prompt the client station for additional information that may enable the failed validation operation(s) to be re-validated. For example, if the security check fails and the receiving zone determines that the data access request is indicative of potential malicious activity (e.g., user authentication and user permissions checks succeed, but the receiving zone determines during the security check that the location of the client station is not a location typically associated with the user), the receiving zone may temporarily pause processing the request and transmit a prompt to a client station (which may be the same client station that transmitted the data access request or a different client station associated with a different user, such as the user's supervisor or a designated security officer associated with the user's employer that is responsible for reviewing malicious activity) indicating that the data access request has been identified as suspicious activity, along with an indication of the reasons why the request was flagged as suspicious, and perhaps also a request to confirm the requested access (e.g., the MCP 300 may cause the client station to display a notification at the front-end user interface indicating that the MCP 300 has detected an unusual location for the user and prompting the user to confirm the request to access the user data).

As yet another possibility, in some instances where the request to access user data involves more than one data object, it is possible that the validation operation(s) may yield different outcomes for different data objects. For instance, the validation operation(s) for some of the data objects may succeed while the validation operation(s) for other of the data objects may fail. In such instances, the receiving zone may process the request with respect to only those data objects where all of the performed the validation operation(s) succeeded.

The receiving zone may take various other actions in response to the validation operation(s) outcomes as well.

After the one or more validation operations have been completed and the receiving zone has determined that the requested access to the user data (or a subset of the user data, in an instance where the user data includes more than one data object, and the validation operation(s) succeeded for some data objects and failed for other data objects) is valid and will be allowed, the receiving zone, which is Zone 7 in the example of FIG. 6, may then proceed to determine the storage location of the user data, as shown at 610 of FIG. 6, in order to then retrieve the user data and provide it to the user.

Zone 7 may determine the storage location of the user data based on the routing address included in the set(s) of metadata that was received from Zone 4 at 606. As discussed above, the routing address of a data object may include information that identifies the storage location of the data object in terms of a combination of data elements that each provides a piece of information regarding the storage location. Based on one or more data elements included in the routing address, such as a "zone" data element (perhaps along with preceding data element(s)), Zone 7 may determine the zone where the data resides. Then, depending on whether or not the determined residency zone is the receiving zone or a different zone, Zone 7 may proceed to process the request internally or route the request to the determined zone for processing.

In the example of FIG. 6, if, at 610, Zone 7 determines that the user data resides in the receiving zone, which is Zone 7, it may proceed to process the data access request by, at 612, retrieving the requested user data, or at least a portion of the requested user data (e.g., the user data that was requested may have included more than one data objects for which validation operation(s) did not succeed) from a data storage of the receiving zone (based on the routing address information).

However, if, at 610, Zone 7 determines that the user data resides in a different zone other than Zone 7, it may, at 614, route the data access request to the other zone where the user data resides. In this regard, routing the data access request to the other zone may comprise transmitting a request to retrieve the user data to the other zone where the user data resides (which may be referred to herein as a residency zone), depicted in FIG. 6 as "Zone X," which may be any one of the other zones of MCP 300, including Zones 1-6 or Zone 8.

The request transmitted from the receiving zone, Zone 7, to the residency zone, Zone X, may take various forms. As one example, the request may include the routing address for the user data, or at least a portion of the routing address (e.g., the ID data element, and perhaps one or more other data elements such as the zone data element and/or the service data element), thereby enabling Zone X to locate and retrieve the user data from its data storage. As another example, the request may include other identifying information for the user data that may facilitate Zone X in retrieving the user data. As yet another example, the request may include information about the validation operation(s) that were performed by the receiving zone, which may be used by Zone X to make a determination regarding whether or not to perform its own validation operation(s) on the request.

After receiving the request from Zone 7, Zone X may take various actions to process the request. As one possibility, Zone X may optionally perform its own set of one or more validation operation(s) on the data access request, which may comprise one or more of the same types of validation operation(s) that were performed by Zone 7 and/or one or more additional types of validation operation(s) that include additional validation check(s) on the data access request. Zone X may then take one or more actions after performing the validation operation(s) as discussed above with respect to 608 of FIG. 6. As another possibility, Zone X may proceed to retrieve the user data, based on the routing address, from a data storage of Zone X.

Ultimately, based on the data validation operation(s) being successful for the user data or at least a portion thereof, Zone X may proceed to retrieve the user data, or at least the portion thereof, from a data storage of Zone X. After retrieving the user data from its data storage, Zone X may return the retrieved data to Zone 7 so that Zone 7 can then provide the retrieved data to the client station at 616, which will be discussed in more detail further below. Alternatively, in some implementations, Zone X may provide the retrieved data directly to the client station (e.g., by transmitting the retrieved data over a data network to the client station).

As previously mentioned, the user data may comprise more than one different data object. In some instances where the user data comprises multiple data objects, at 610, the receiving zone may determine that different data objects of the user data reside at more than one residency zones. In such instances, the receiving zone may issue a request to each residency zone to retrieve the respective data object(s) that reside at that residency zone. Each request may include at least a portion of the routing address for the respective data object(s), thereby enabling each residency zone to retrieve the respective data object(s). Additionally, each request may optionally include respective identifying information for the respective data object(s). After retrieving the respective data object(s) from its data storage, each residency zone may then either return the retrieved data object(s) to the receiving zone to be provided to the client station or alternatively, provide the retrieved data object(s) directly to the client station at 616, which will be discussed in more detail further below.

After Zone 7 has retrieved the user data or at least a portion thereof (either from its own data storage at 612 or from one or more other zones at 614), at 616, Zone 7 may proceed to provide the retrieved data to the client station in a manner that enables the client station to present the data via a front-end interface of the client station.

Figure 7:
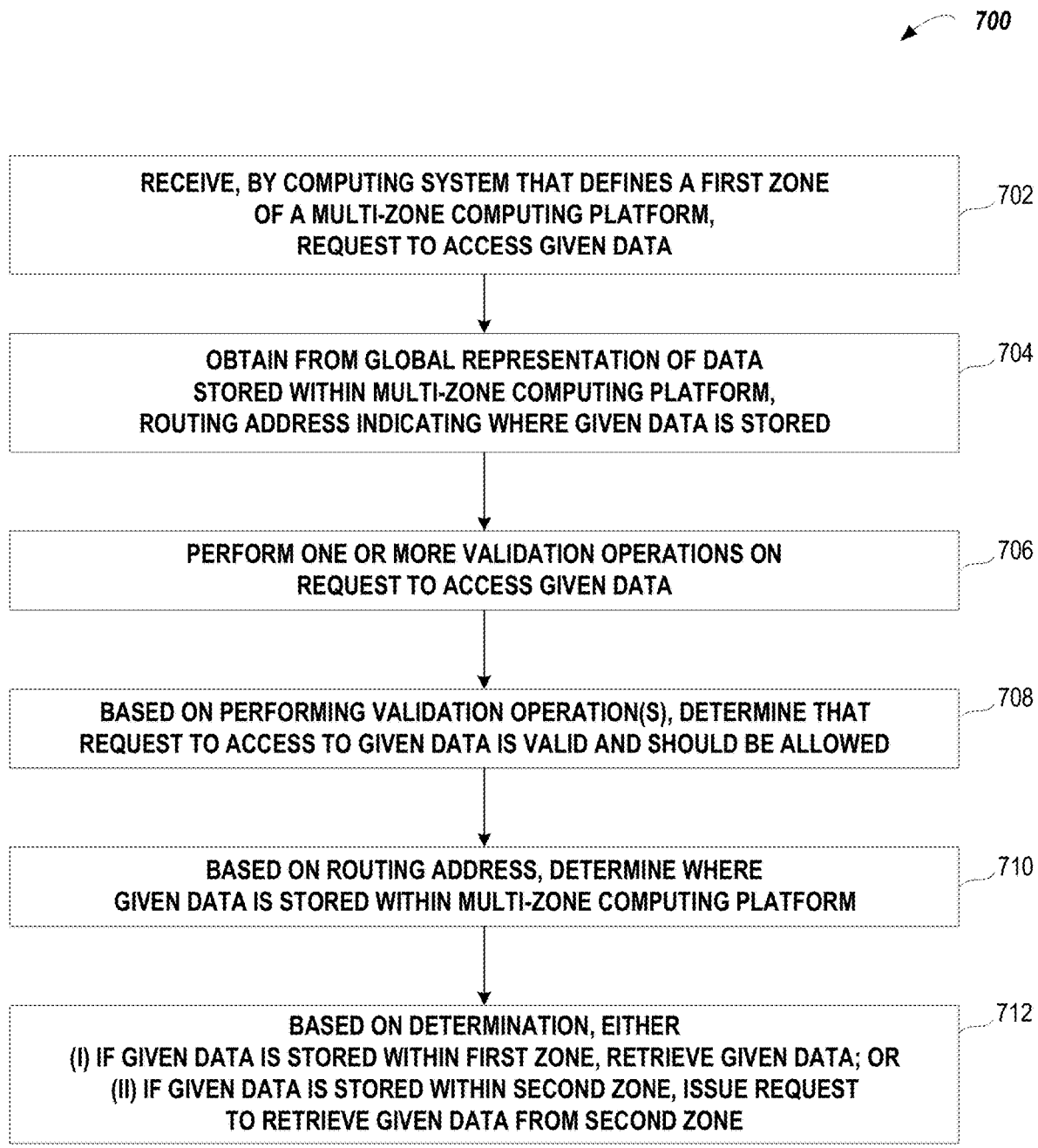
FIG. 7 depicts an example process for processing a request to access data that may be carried out by a given zone of the multi-zone computing platform of FIG. 3.

With reference now to FIG. 7, an example process 700 that depicts operations that may be performed by a computing system that defines a first zone of a multi-zone computing platform in accordance with the technology and techniques disclosed herein is described. It should be understood that each block in flow diagram 700 may represent a module or portion of program code that includes instructions that are executable by a processor to implement specific logical functions or steps in a process. The program code may be stored on any type of computer-readable medium, such as non-transitory computer readable media (e.g., data storage 204 shown in FIG. 2). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. The flow diagram 700 may also be modified to include additional blocks that represent other functionality that is described expressly or implicitly elsewhere herein.

FIG. 7 depicts a flow diagram of an example process 700 that may be performed by a computing system that defines a first zone of a multi-zone computing platform that is configured to host a SaaS application and communicate over at least one data network, in accordance with the technology and techniques disclosed herein and described above.

The example process 700 may begin at block 702, when the computing system receives, from a client station configured to communicate with the multi-zone computing platform, a request to access given user data that is stored within the multi-zone computing platform. The given user data that is requested for access by the client station may comprise one or more data objects that are stored within the multi-zone computing platform. As discussed above, in practice, the request to access the given user data may be generated by the client station based on receiving an input from a user indicating a request to access the given user data.

After receiving the request to access the given user data, at block 704, the computing system may obtain, from a global representation of available user data that is stored within the multi-zone computing platform, a respective set of metadata for each data object included in the given user data, wherein each respective set of metadata includes at least a routing address that indicates where the data object is stored within the multi-zone computing platform. The routing address may take any of various forms, including those discussed above. Additionally, each respective set of metadata obtained from the global representation may include other information about the data object, such as a data object identifier, a data object type, and/or relationship metadata, as well as any other information discussed above with reference to FIG. 4.

After receiving the metadata for the given user data from the global representation, at block 706, the computing system may perform a set of one or more validation operations on the request to access the given data in order to determine if the request to access the given user data is valid. The set of validation operation(s) may include various types of validation operations, including one or more of the validation operations discussed above with respect to FIG. 6, such as an authentication check, a permissions check, a data export regulations check, and/or a security check.

At block 708, based on performing the set of validation operation(s) on the request to access the given user data, the computing system may determine that the request to access the given data is valid and should be allowed. Thereafter, at block 710, the computing system may, based on the routing address included in the metadata obtained from the global representation, determine where the given user data is stored within the multi-zone computing platform.

At block 712, based on determining where the given user data is stored within the multi-zone computing platform, the computing system may either (i) if the given user data is stored within the first zone, retrieve the given user data from a storage location at the first zone, or (ii) if the given user data is stored within a second zone different from the first zone, issue a request to the second zone to retrieve the given user data and return it to the computing system, wherein the request includes at least the routing address for the given user data.

If the given user data is stored within the first zone, after retrieving the given user data from the storage location at the first zone, the computing system may then proceed to provide at least a portion of the retrieved data to the client station in a manner that enables the client station to display the retrieved data. If the given user data is stored within the second zone, after the computing system issues the request to the second zone to retrieve the given user data, the computing system may receive, from the second zone, the retrieved given user data. Thereafter, the computing system may provide at least a portion of the retrieved data to the client station in a manner that enables the client station to display the retrieved data. Alternatively, after the computing system issues the request to the second zone to retrieve the given user data, the second zone may proceed to retrieve the given user data and then provide the retrieved given user data to the client station, in which case, the computing system may take no further actions in processing the request to access the given user data.

It should be understood that the example process 700 described in FIG. 7 is only one example of a process that may be carried out by a computing system that defines a zone of a multi-zone computing platform in order to process a data access request in accordance with the technology and techniques disclosed herein. Many other example processes and embodiments have also been described herein.

IV. Conclusion

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed metadata network and techniques for routing data may be implemented in areas other than construction and construction-related projects. The disclosed software technology for distributing and routing may be used in other ways as well.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system that defines a first zone of a multi-zone computing platform that hosts a Software as a Service (SaaS) application, the computing system comprising:
   at least one network interface;
   at least one processor;
   at least one non-transitory computer-readable medium; and
   program instructions stored on the non-transitory computer-readable medium that are executable by the at least one processor such that the computing system that defines the first zone is configured to:
      receive, from a client station, a request to access at least one given data object that is stored within the multi-zone computing platform;
      obtain, from a global representation of all available data that is stored within the multi-zone computing platform, a routing address that includes information indicating a given zone of the multi-zone computing platform where the at least one given data object is stored, wherein the global representation is stored within a particular zone of the multi-zone computing platform;
      perform a first iteration of one or more validation operations on the request to access the at least one given data object;
      based on performing the first iteration of one or more validation operations, determine that the request to access the at least one given data object is valid and should be allowed;
      based on (i) the routing address obtained from the global representation and (ii) determining that the request to access the at least one given data object is valid and should be allowed, identify the given zone of the multi-zone computing platform where the at least one data object is stored;
      based on identifying the given zone: if the at least one given data object is stored within the first zone of the multi-zone computing platform, retrieve the at least one given data object from the first zone, or else if the at least one given data object is stored within a second zone of the multi-zone computing platform that is different from the first zone, issue a request for the second zone to perform a second iteration of one or more validation operations on the request to access the at least one given data object, and based on determining that the request to access the at least one given data object is valid and should be allowed, retrieve the at least one given data object from the second zone; and
      based on retrieval of the at least one given data object, cause the request to access the at least one given data object to be granted.

2. The computing system of claim 1, wherein the client station is associated with a given user, and wherein the program instructions stored on the non-transitory computer-readable medium that are executable by the at least one processor such that the computing system is configured to perform the one or more validation operations comprise program instructions stored on the non-transitory computer-readable medium that are executable by the at least one processor such that the computing system is configured to:
   perform an authentication check to determine if the given user is authenticated.

3. The computing system of claim 1, wherein the client station is associated with a given user, and wherein the program instructions stored on the non-transitory computer-readable medium that are executable by the at least one processor such that the computing system is configured to perform the one or more validation operations comprise program instructions stored on the non-transitory computer-readable medium that are executable by the at least one processor such that the computing system is configured to:

perform a permissions check to determine if the given user has permission to access the at least one given data object.

4. The computing system of claim 1, wherein the program instructions stored on the non-transitory computer-readable medium that are executable by the at least one processor such that the computing system is configured to perform the one or more validation operations comprise program instructions stored on the non-transitory computer-readable medium that are executable by the at least one processor such that the computing system is configured to:

determine if allowing the request to access the at least one given data object complies with data export regulations associated with one or both of the first zone or the second zone.

5. The computing system of claim 1, wherein the at least one given data object is stored within the first zone, and wherein the program instructions stored on the non-transitory computer-readable medium that are executable by the at least one processor such that the computing system is configured to cause the request to access the at least one given data object to be granted comprise program instructions that are executable by the at least one processor such that the computing system is configured to:

after retrieving the at least one given data object from the first zone:
provide at least a portion of the retrieved at least one given data object to the client station.

6. The computing system of claim 1, wherein the at least one given data object is stored within the second zone, and wherein the program instructions stored on the non-transitory computer-readable medium that are executable by the at least one processor such that the computing system is configured to issue the request to retrieve the at least one given data object from the second zone comprise program instructions stored on the non-transitory computer-readable medium that are executable by the at least one processor such that the computing system is configured to:

transmit to the second zone a request to retrieve the at least one given data object, wherein the request includes at least a portion of the routing address.

7. The computing system of claim 6, further comprising program instructions stored on the non-transitory computer-readable medium that are executable by the at least one processor such that the computing system is configured to:

receive the retrieved at least one given data object from the second zone, wherein the program instructions that are executable by the at least one processor such that the computing system is configured to cause the request to access the at least one given data object to be granted comprise program instructions that are executable by the at least one processor such that the computing system is configured to:

provide at least a portion of the retrieved at least one given data object to the client station.

8. The computing system of claim 1, wherein the program instructions stored on the non-transitory computer-readable medium that are executable by the at least one processor such that the computing system is configured to obtain, from the global representation of all available data that is stored within the multi-zone computing platform, the routing address for the at least one given data object comprise program instructions stored on the non-transitory computer-readable medium that are executable by the at least one processor such that the computing system is configured to:

retrieve, from the global representation, metadata for the at least one given data object, wherein the metadata includes at least the routing address.

9. The computing system of claim 1, wherein the particular zone where the global representation is stored comprises a third zone of the multi-zone computing platform, and wherein the program instructions stored on the non-transitory computer-readable medium that are executable by the at least one processor such that the computing system is configured to obtain, from the global representation of all available data that is stored within the multi-zone computing platform, the routing address for the at least one given data object comprise program instructions stored on the non-transitory computer-readable medium that are executable by the at least one processor such that the computing system is configured to:

transmit to the third zone a request to retrieve, from the global representation, metadata for the at least one given data object; and receive, from the third zone, the retrieved metadata for the at least one given data object, wherein the metadata includes at least the routing address for the at least one given data object.

10. At least one non-transitory computer-readable medium, wherein the at least one non-transitory computer-readable medium is provisioned with program instructions that, when executed by at least one processor, cause a computing system that defines a first zone of a multi-zone computing platform that hosts a Software as a Service (SaaS) application to:

receive, from a client station, a request to access at least one given data object that is stored within the multi-zone computing platform;

obtain, from a global representation of all available data that is stored within the multi-zone computing platform, a routing address that includes information indicating a given zone of the multi-zone computing platform where the at least one given data object is stored, wherein the global representation is stored within a particular zone of the multi-zone computing platform;

perform a first iteration of one or more validation operations on the request to access the at least one given data object;

based on performing the first iteration of one or more validation operations, determine that the request to access the at least one given data object is valid and should be allowed;

based on (i) the routing address obtained from the global representation and (ii) determining that the request to access the at least one given data object is valid and should be allowed, identify the given zone of the multi-zone computing platform where the at least one data object is stored;

based on identifying the given zone, (i) if the at least one given data object is stored within the first zone of the multi-zone computing platform, retrieve the at least one given data object from the first zone, or else (ii) if the at least one given data object is stored within a second zone of the multi-zone computing platform that is different from the first zone, issue a request for the second zone to perform a second iteration of one or more validation operations on the request to access the at least one given data object, and based on determining that the request to access the at least one given data object is valid and should be allowed, retrieve the at least one given data object from the second zone; and based on retrieval of the at least one given data object, cause the request to access the at least one given data object to be granted.

11. The at least one non-transitory computer-readable medium of claim 10, wherein the client station is associated with a given user, and wherein the program instructions that, when executed by the at least one processor cause the computing system to perform the one or more validation operations comprise program instructions that, when executed by the at least one processor cause the computing system to:

perform an authentication check to determine if the given user is authenticated.

12. The at least one non-transitory computer-readable medium of claim 10, wherein the client station is associated with a given user, and wherein the program instructions that, when executed by the at least one processor cause the computing system to perform the one or more validation operations comprise program instructions that, when executed by the at least one processor cause the computing system to:

perform a permissions check to determine if the given user has permission to access the at least one given data object.

13. The at least one non-transitory computer-readable medium of claim 10, wherein the program instructions that, when executed by the at least one processor cause the computing system to perform the one or more validation operations comprise program instructions that, when executed by the at least one processor cause the computing system to:

determine if allowing the request to access the at least one given data object complies with data export regulations associated with one or both of the first zone or the second zone.

14. The at least one non-transitory computer-readable medium of claim 10, wherein the at least one given data object is stored within the first zone, and wherein the at least one non-transitory computer-readable medium is also provisioned with program instructions that, when executed by the at least one processor cause the computing system to:

after retrieving the at least one given data object from the first zone:
provide at least a portion of the retrieved at least one given data object to the client station.

15. The at least one non-transitory computer-readable medium of claim 10, wherein the at least one given data object is stored within the second zone, and wherein the program instructions that, when executed by the at least one processor cause the computing system to issue the request to retrieve the at least one given data object from the second zone comprise program instructions stored on the non-transitory computer-readable medium that, when executed by the at least one processor cause the computing system to:

transmit to the second zone a request to retrieve the at least one given data object, wherein the request includes at least a portion of the routing address.

16. The at least one non-transitory computer-readable medium of claim 15, wherein the at least one non-transitory computer-readable medium is also provisioned with program instructions that, when executed by the at least one processor cause the computing system to:

receive the retrieved at least one given data object from the second zone, wherein the program instructions that, when executed by the at least one processor cause the computing system to cause the request to access the at least one given data object to be granted comprise program instructions that, when executed by the at least one processor cause the computing system to:

provide at least a portion of the retrieved at least one given data object to the client station.

17. The at least one non-transitory computer-readable medium of claim 10, wherein the program instructions that, when executed by the at least one processor cause the computing system to obtain, from the global representation of all available data that is stored within the multi-zone computing platform, the routing address for the at least one given data object comprise program instructions that, when executed by the at least one processor cause the computing system to:

retrieve, from the global representation, metadata for the at least one given data object, wherein the metadata includes at least the routing address.

18. The at least one non-transitory computer-readable medium of claim 10, wherein the particular zone where the global representation is stored comprises a third zone of the multi-zone computing platform, and wherein the program instructions that, when executed by the at least one processor cause the computing system to obtain, from the global representation of all available data that is stored within the multi-zone computing platform, the routing address for the at least one given data object comprise program instructions that, when executed by the at least one processor cause the computing system to:

transmit to the third zone a request to retrieve, from the global representation, metadata for the at least one given data object; and receive, from the third zone, the retrieved metadata for the at least one given data object, wherein the metadata includes at least the routing address for the at least one given data object.

19. A method carried out by a computing system that defines a first zone of a multi-zone computing platform that hosts a Software as a Service (SaaS) application, the method comprising:

receiving, from a client station, a request to access at least one given data object that is stored within the multi-zone computing platform;

obtaining, from a global representation of all available data that is stored within the multi-zone computing platform, a routing address that includes information indicating a given zone of the multi-zone computing platform where the at least one given data object is stored, wherein the global representation is stored within a particular zone of the multi-zone computing platform;

performing a first iteration of one or more validation operations on the request to access the at least one given data object;

based on performing the first iteration of one or more validation operations, determining that the request to access the at least one given data object is valid and should be allowed;

based on (i) the routing address obtained from the global representation and (ii) determining that the request to access the at least one given data object is valid and should be allowed, identifying the given zone of the multi-zone computing platform where the at least one data object is stored;

based on identifying the given zone, (i) if the at least one given data object is stored within the first zone of the multi-zone computing platform, retrieving the at least one given data object from the first zone, or else (ii) if the at least one given data object is stored within a second zone of the multi-zone computing platform that is different from the first zone, issuing a request for the second zone to perform a second iteration of one or more validation operations on the request to access the at least one given data object, and based on determining that the request to access the at least one given data object is valid and should be allowed, retrieve the at least one given data object from the second zone; and based on retrieval of the at least one given data object, causing the request to access the at least one given data object to be granted.

20. The method of claim 19, further comprising:

determining if allowing the request to access the at least one given data object complies with data export regulations associated with one or both of the first zone or the second zone.

\* \* \* \* \*